(12) United States Patent
Montemayor et al.

(10) Patent No.: US 8,841,845 B2
(45) Date of Patent: Sep. 23, 2014

(54) PROXIMITY-BASED WIRELESS LIGHTING SYSTEM

(76) Inventors: Ricardo Montemayor, Laredo, TX (US); Christopher Stimek, Fort Worth, TX (US); Eduardo Hinojosa, Fort Worth, TX (US)

( * ) Notice: Subject to any disclaimer, the term of this patent is extended or adjusted under 35 U.S.C. 154(b) by 157 days.

(21) Appl. No.: 13/556,207

(22) Filed: Jul. 24, 2012

(65) Prior Publication Data

US 2014/0028186 A1    Jan. 30, 2014

(51) Int. Cl.
*H05B 41/16* (2006.01)

(52) U.S. Cl.
USPC ................................ 315/70; 315/76; 315/256

(58) Field of Classification Search
USPC ............... 315/70, 76, 256; 307/104, 9.1, 10.1
See application file for complete search history.

(56) References Cited

U.S. PATENT DOCUMENTS

| 7,764,177 | B2 * | 7/2010 | Stewart | 340/572.7 |
|---|---|---|---|---|
| 8,441,154 | B2 * | 5/2013 | Karalis et al. | 307/104 |
| 8,466,583 | B2 * | 6/2013 | Karalis et al. | 307/104 |
| 8,552,592 | B2 * | 10/2013 | Schatz et al. | 307/104 |
| 8,587,153 | B2 * | 11/2013 | Schatz et al. | 307/104 |
| 2012/0043887 | A1 * | 2/2012 | Mesibov | 315/76 |

* cited by examiner

*Primary Examiner* — Vibol Tan
(74) *Attorney, Agent, or Firm* — Warren V. Norred

(57) ABSTRACT

The invention is an induction-based lighting system designed to provide power to model displays and other similar applications. The first part of the system is the wireless Power Mat that is placed under the model houses and used as the base for the village, and contains a primary winding that interacts with secondary windings placed inside display components to provide lighting effects, such as one finds in model Christmas villages. The electrical characteristics of the primary winding can be controlled by a microcontroller to make lights in the models blink or change as a user desires.

13 Claims, 9 Drawing Sheets

13 - mat    79 - model home
17 - tag    81 - drinking glass
23 - mat connector

13 - mat  79 - model home
17 - tag  81 - drinking glass
23 - mat connector

PROXIMITY-BASED WIRELESS LIGHTING SYSTEM

CROSS-REFERENCES TO RELATED APPLICATIONS

None.

STATEMENT REGARDING FEDERALLY SPONSORED RESEARCH AND DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

The invention concerns wireless inductive lighting systems for models, decorative lighting, and communications using variable frequency power.

2. Background Art

During special occasions, many families enjoy setting model displays on mantels or around Christmas trees, such as 18th century villages and manger scenes. The village is made up of multiple building models all with their own light source. Each building is positioned and their light source is connected to a power strip to give the buildings their power. All the power cables are then hidden carefully under a white fabric resembling snow.

There are many problems with this system. Once the models are positioned and their power cables are connected, it is very time intensive to reposition the models. This requires unplugging the power cable, moving the model, plugging in the power cable and hiding the cable. Also, the large number of power cables all connecting to a single outlet presents a fire hazard as well as risks tripping a circuit breaker. Additionally, efforts to hide all of the power cables are time consuming and is seldom aesthetically pleasing. Lastly, when these models are removed at the end of the season, the large number of power cords make storing the Christmas village very cumbersome.

One approach to lessen the difficulty is to use battery-powered lighting. However, these devices often experience battery acid leakage and corrosion while in long-term storage between device usage. These displays would benefit greatly by a method of lighting the models that did not involve a power cord for every lighted model or batteries.

The invention herein described uses inductive power provided by a first winding in a mat, delivered to second windings that are part of the model(s) to be lit. Use of inductive power is well known in electrical engineering; Nikola Tesla first demonstrated such power transfer in the late 19th century. Many systems exist to charge batteries and other devices. However, recent products are seeking to use contactless power transfer, often to charge a mobile phone or other battery-powered device by sitting it on a recharging mat. A primary coil in the mat creates a time varying magnetic field that interacts with and delivers power to a secondary coil in the device to be charged.

A popular development group for near field inductive power is the Wireless Power Consortium ("WPC"), formed in 2008 to assist companies developing products. The WPC specification, developed less than two years later, defines its own operating parameters to transfer upwards of 5 W using ac frequencies of 100 to 205 kHz, and includes communications between the mat and device being charged.

The WPC specification is fairly complex, detailing control signals to actuate a primary coil that interacts with a secondary coil in a device to be powered and a digital logic control communication protocol. The Consortium's specification also includes a definition of a primary coil that is specific in width (40 mm) and thickness (2mm), among other details of construction, including wire gage, shielding, etc. It is aimed at charging an expensive cell phone, and not appropriate for inexpensive lighting systems that are inherently capable of operation under a wide range of electrical conditions.

What is needed is a lighting system designed to provide power by induction to inexpensive lighting devices.

BRIEF SUMMARY OF THE INVENTION

The invention shown in FIG. 1 is an induction-based Lighting System 11 designed to provide power to model displays and other similar applications. The first part of the system is the wireless Power Mat 13 that is placed under the model houses and used as the base for the village. The Power Mat 13 replaces the decorative cloth or felt base typically used as the base for the village. The Mat 13 is powered from a standard AC wall adapter or batteries and generates a time-varying magnetic field to inductively power lights through a secondary winding. Mats can be different sizes to suit the avid Christmas decorator along with individuals looking to set up their model quickly.

The Lighting System uses a small wireless illumination "Tag" 17 that can fit inside the models with a light-emitted diode ("LED") and other basic circuitry, including a secondary winding that interacts with the mat. This Tag 17 replaces incandescent lights currently in the models, as well as with the power cable that is made unnecessary. Tags 17 are populated with lights of different brightness, color and blinking or flickering features.

The following explanation discusses one embodiment of the invention, comprising a flexible Christmas village mat that can be rolled for easy storage, and several inductively powered lights. Other applications using the same invention are also discussed.

BRIEF DESCRIPTION OF THE SEVERAL VIEWS OF THE DRAWING(S)

Figure 6:
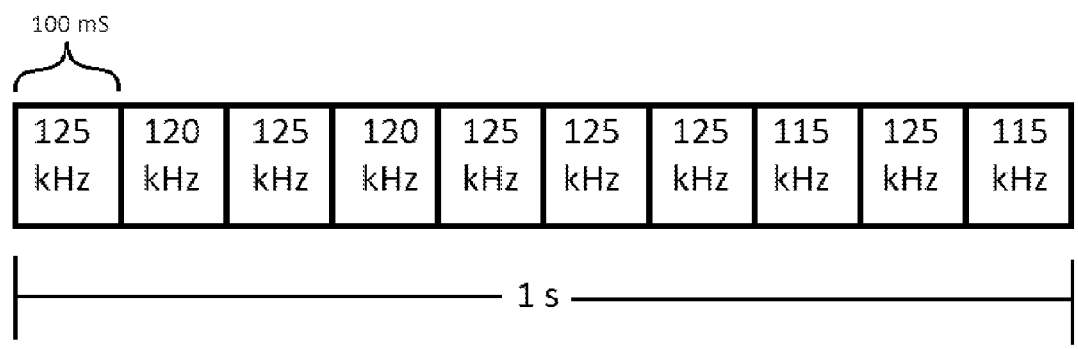

FIG. 6 provides an example of time division frequency switching.

Figure 7:
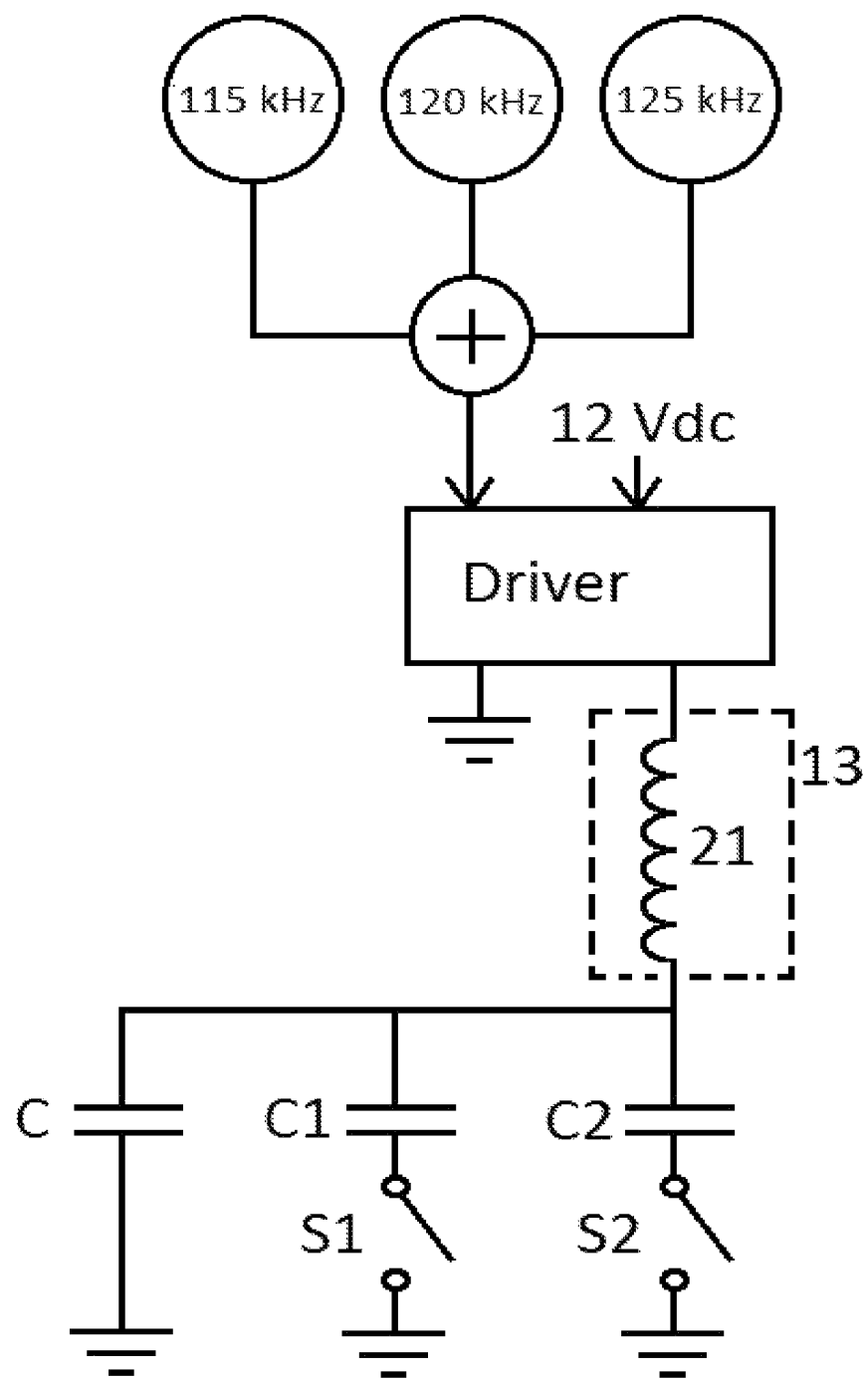

FIG. 7 shows a method of varying frequencies using superposition.

Figure 8:
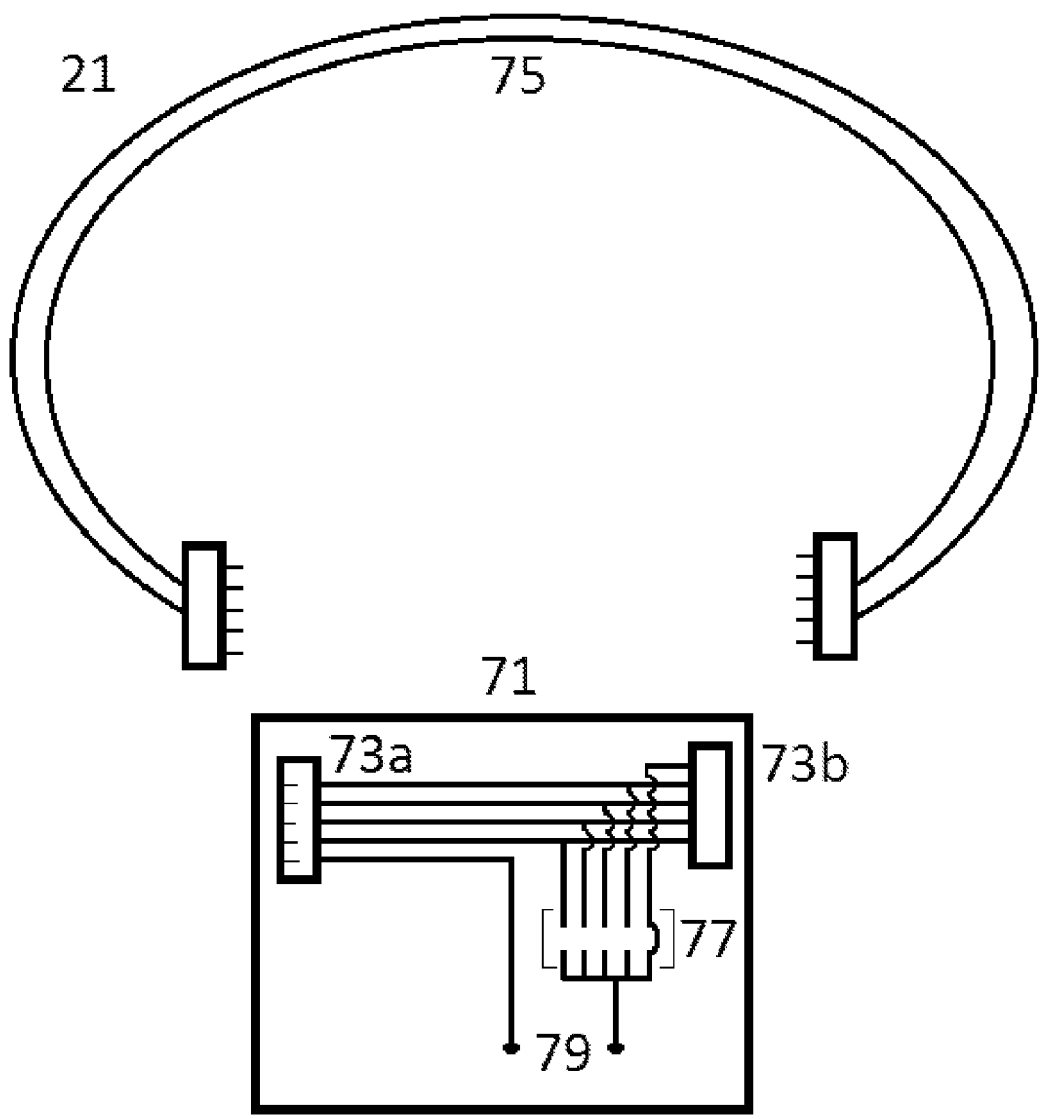

FIG. 8 shows a Primary Winding build from five-conductor ribbon cable.

Figure 9:
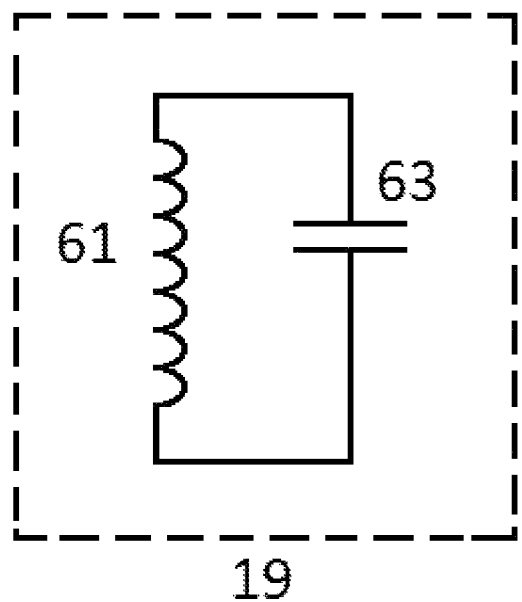

FIG. 9 shows a block diagram of one embodiment of an Auxiliary Mat.

DETAILED DESCRIPTION OF THE INVENTION

The invention described herein builds upon the basic inductive wireless power transfer system (specifically resonant inductive coupling) with enhancements to specifically support a wireless illumination system for models (model rail road sets, Christmas villages), games (illuminated chess sets, children's play sets with light up cars), furniture (illuminated cups in movie theatres and trendy bars, doll cases, flower vase with light up flowers, kids teapot table or table runner with light up dishes, and aquariums where waterproof Tags are located at the bottom of the aquarium), and flooring (where illuminated shoes and other items that could light up when placed in certain locations).

Figure 1:
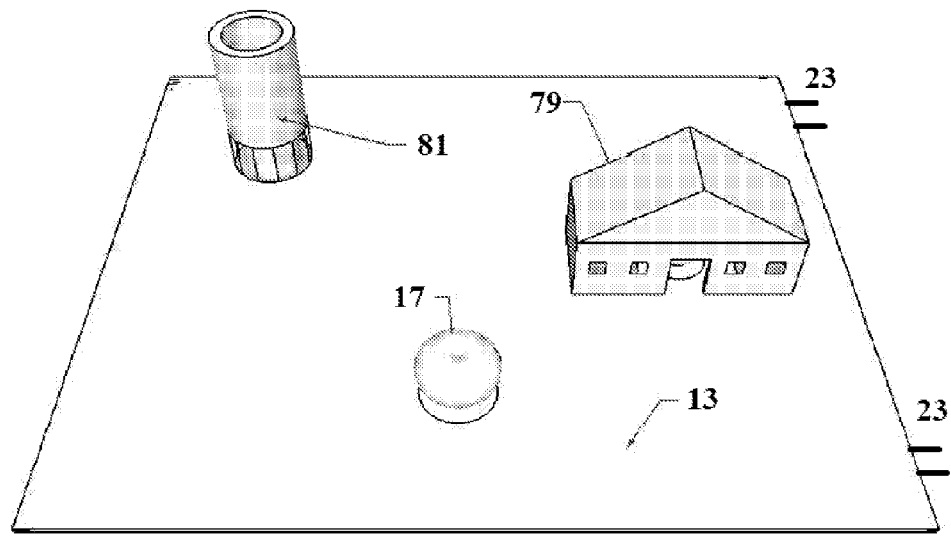
FIG. 1 shows the Lighting System in use.

As shown in FIG. 1, the invention 11 comprises two essential components: a wireless Power Mat 13 and illumination Tags 17. A Primary Winding 21 is embedded within the Mat 13, typically not visible to users, but is represented as the inductive Primary Winding 21 in FIG. 3. Power is transferred inductively between the Power Mat 13 and multiple Tags 17 simultaneously and Tags 17 can be designed with circuitry to blink or flicker. The Power Mat 13 supports the ability to operate on multiple frequencies using time slicing allowing it to independently control Tags 17 tuned to different frequencies. A more complex Advanced Auxiliary Mat 15 that acts in accordance with sensors and switch inputs is also described, incorporating a Light Sensor 31 to automatically activate in darkness, as well as a Timer 33 and Pushbutton 35 to allow the user to turn it on for a preset period or programmed schedule, or change the frequency with the Pushbutton 35.

Finally, a user can employ an Auxiliary Mat 19, depicted in the electronic representation shown in FIG. 9, which is identical to the Power Mat 13, except that it obtains its power by reacting with the Power Mat's Primary Winding 21. The Auxiliary Mat 19 is simply properly placed next to the Power Mat 13. The Power Mat's Primary Winding 21 delivers power to the winding in the Auxiliary Mat 19, which in turn, provides power to the Tags 17 placed on the Auxiliary Mat 19.

Figure 2A:
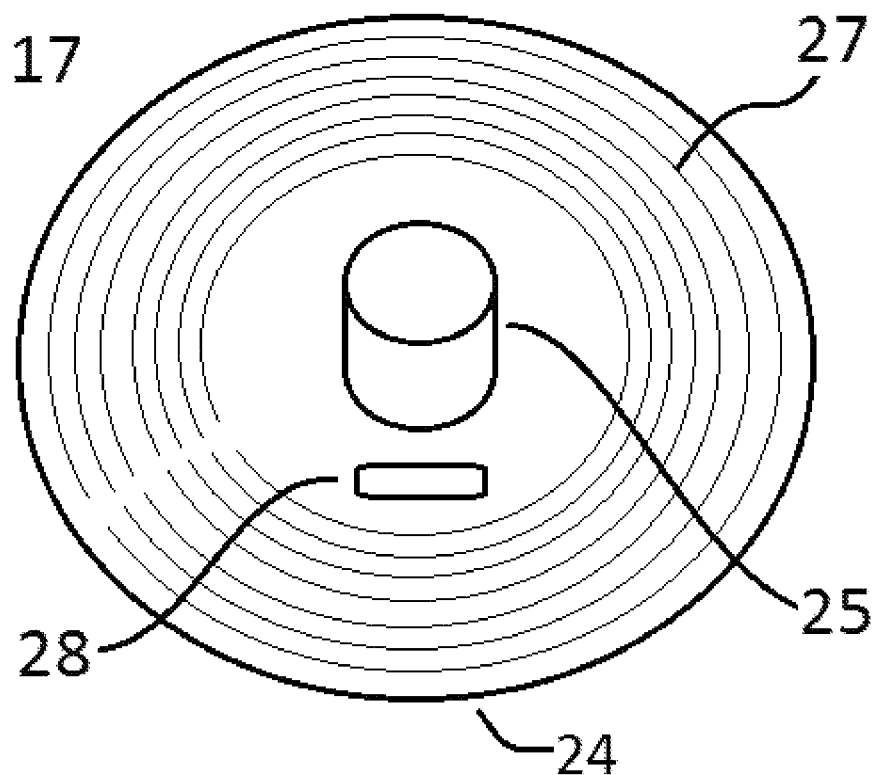
FIG. 2A shows one embodiment of a Tag's physical construction.
Figure 2B:
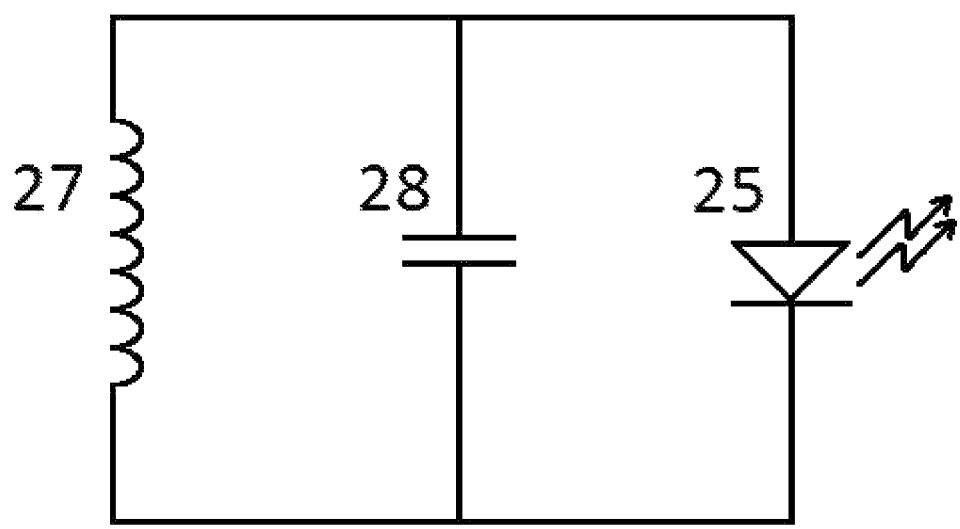
FIG. 2B shows one possible schematic of a Tag.

Illuminator Tags—As shown in FIGS. 2A and 2B, the Tags 17 consist of a parallel tuned LC-resonant circuit composed of the Secondary Winding 27 and Tag Capacitor 28, typically tuned in the neighborhood of 125 kHz, and an LED 25. The impedance of a parallel tuned resonant circuit approaches infinity at the resonant frequency, which means that the voltage induced in the Tag's Coil 27 (which is at or near the resonant frequency of the circuit) is not absorbed by the tuned circuit but is instead used by the LED 25 to provide light. The amount of energy absorbed by the Tag 17 from the Power Mat 13 is dependent on many factors including strength of the field, proximity of the Tag 17 to the Mat 13, orientation of the Tag 17, number of turns and size of the Tag's Coil (or Secondary Winding) 27. Basically, the more magnetic field lines that are cut by the Tag's Secondary Winding 27, the more energy that is extracted from the field and available to power the LED 25 and whatever other circuitry is on the Tag 17.

The most simple design uses an LED to rectify the alternating current generated in the Secondary Coil 27 of the Tag to power said LED 25. A more complex tag design would rectify the alternating current generated by the Power Mat 13 to create lighting effects on the Tag 17 such as a flickering fire. To simplify the Tag 17 construction, the Tag's Secondary Winding 27 is etched onto a circuit Board 24 (shown in FIG. 2A) using standard circuit board manufacturing techniques which ensures consistent performance. The LED 25 and Capacitor 28 are also soldered to the Board 24 which provides a convenient structure for the Tag 17. Additionally, a small commercially available ferrite core inductor can be used instead of an air core coil or circuit-board etched coil allowing a more compact design in some situations.

As long as the Tag 17 can be placed inside of the Power Mat's magnetic field, it will illuminate, providing a large number of possibilities in terms of applications since the magnetic field will penetrate most non-conductive materials, including plastic, wood, and glass, allowing the Tag 17 and or the Power Mat 13 to be embedded inside objects and table tops. A single Power Mat 13 can be used to power multiple Tags 17 simultaneously due to the size of the Power Mat's magnetic field. A multi-frequency mat can be used to control Tags or sets of Tags 17 tuned to different frequencies by changing the frequency or strength of the generated magnetic field for different lengths of times to independently power sets of tuned tags to create lighting effects. For example the 125 KHz Tags could be on steadily, while the 120 KHz Tags blink, and the 115 kHz Tags flicker, emulating the motion of fire.

Figure 3:
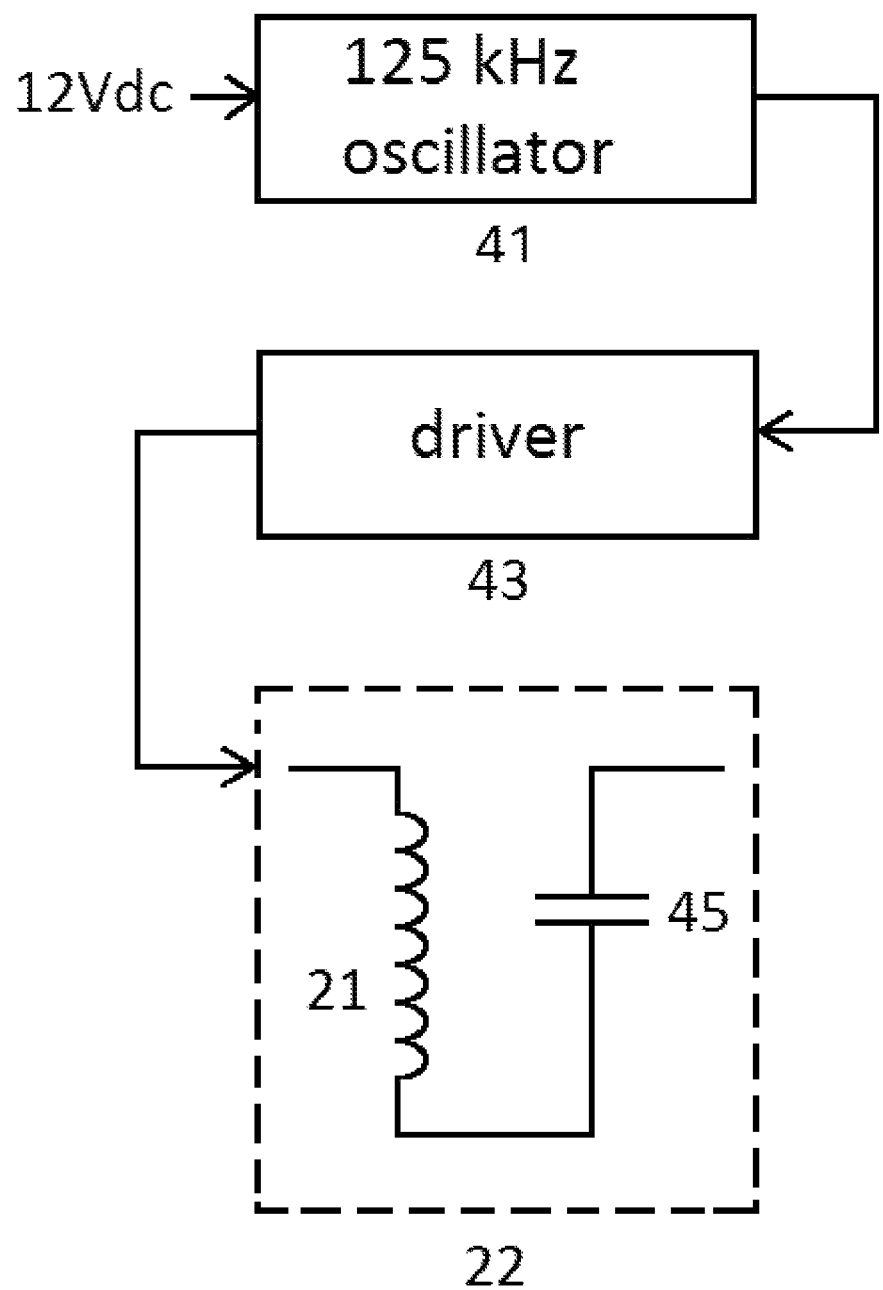
FIG. 3 shows the Power Mat construction.

Wireless Power Mat Details—The system uses resonant inductive coupling to transfer power from the Power Mat 13 to the Tag 17. As shown in FIG. 3, the Power Mat is powered by a direct-current power source, and consists of an Oscillator 41, Driver 43, Mat Capacitor 45, and a Primary Winding 21 which is embedded in the Power Mat 13. The Mat Capacitor 45 and Primary Winding 21 make up a series-tuned resonant inductor-capacitor Circuit 22 designed to resonate at 125 kHz in this application. Optional Mat Connectors 23 are indicated on FIG. 1 that can be used to affix an Auxiliary Mat and hold it in place to receive power from a Power Mat 13 most efficiently; it is assumed that a practitioner in the art can design many types of connectors that would perform this function with ease. Driving the series-resonant Circuit 22 at its resonant frequency minimizes its impedance resulting in maximum current flow through the circuit which results in a maximum magnetic field strength generated by the Primary Winding 21, providing maximum power transfer between the Power Mat 13 and Tag 17. The size of the field is determined by the winding dimensions, the current running through the windings, and the number of turns. In this embodiment, the Primary Winding 21 consists of a 14-turn coil of 26 awg enameled copper wire that runs around the perimeter of the Power Mat 13. Larger systems may require multiple windings, also known as coils.

To create a field large enough to be useful in this application, the Primary Winding 21 runs along the perimeter of the Power Mat 13. To date, the largest mat constructed has been 10" by 44", but the invention is not restricted to any particular size. Tags 17 are placed inside the perimeter of the Primary Winding 21 or just outside it to ensure they are energized. To make the mat easily stored, the Primary Winding 21 is placed between two neoprene sheets allowing it to be rolled up for storage. Current embodiments have employed hand wound windings but costs can easily be reduced in production by using a printed or foil-based coil. A mundane 12 Vdc desktop power supply provides power to the current embodiment of the Power Mat 13, but it could be made battery-powered to support use in toys and other portable applications.

Figure 4:
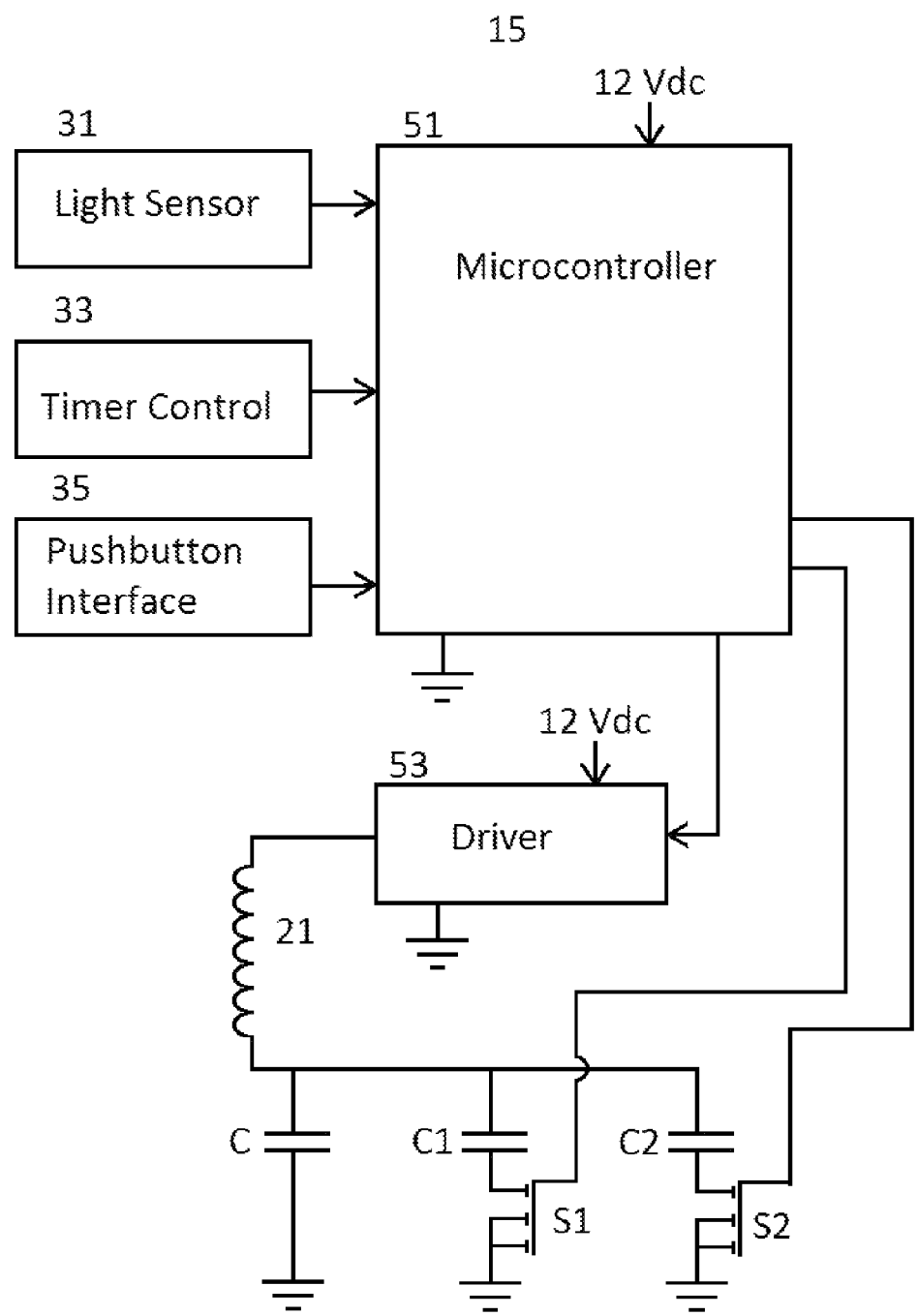
FIG. 4 is a block diagram of one embodiment of an Advanced Mat.

Advanced Power Mat—While the term "mat" is used throughout this specification, the mat could be an actual mat, or a table top or other furniture with a coil and related electronics integrated into the top surface. FIG. 4 shows a block diagram of this Advanced Power Mat ("Advanced Mat") 15 with the enhancements ideal for wireless illumination. The system consists of a Microcontroller 51 which controls current through the Primary Winding 21. It interfaces with a Light Sensor 31 to control the Advanced Mat 15 in low light conditions. It incorporates a Timer 33 and Pushbutton Interface 35 to activate the Timer to allow the user to activate the invention for a programmed period of time. This feature is also useful for games. The Timer can also be used to control the mat at different times of the day. Finally, the Microcontroller 51 has an interface to connect with switches and buttons in support of integrating the invention into toys (e.g. pushing a button could make certain lights blink, dim, or turn on) The Microcontroller 51 generates the 125 kHz waveforms to drive the Primary Winding 21 by operation of a Mat Driver 53. After the Microcontroller 51 operates the Mat Driver 53 to energize the Mat's Primary Winding 21, Tags 17 placed on the Mat's surface will illuminate.

In addition to generating a steady 125 kHz signal the Microcontroller 51 can generate other signals at other frequencies, such as 120 kHz and 115 kHz. To effectively drive the series-resonant circuit with the generated signal, the Microcontroller 51 will adjust the resonant frequency of the tuned circuit by switching in additional capacitors (shown in FIG. 4 as C1 and C2) in parallel with the fixed capacitor C.

Figure 5:
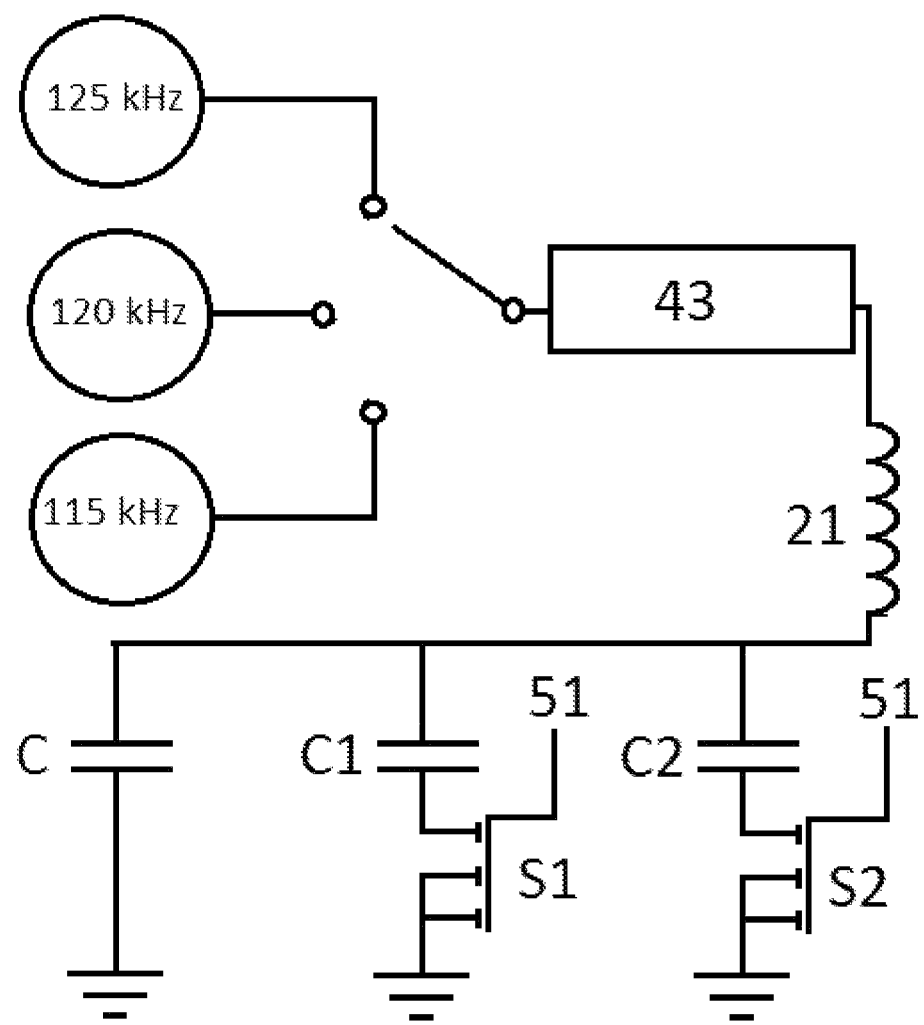
FIG. 5 shows a time division block diagram.

One method for accomplishing this multi-frequency control is to use time-slicing, a practice known in electrical engineering. For example in FIGS. 4 and 5, the microcontroller could generate a signal at 125 kHz driving the series tuned circuit with switches S1 and S2 open, then the frequency could be changed to 120 kHz and S1 could then be closed adding capacitor C1 in parallel with C, lowering the tuned circuit resonant frequency to 120 kHz. The system will be able to use this technique to power Tags tuned to different frequencies and control tuned tags or groups of tuned tags to create lighting effects such as blinking, dimming, or a flickering fire. The Microcontroller 51 will use time-slicing to sequentially power the Tags 17 of various frequencies. For example, the Mat 15 could generate 125 kHz for 10 ms, then 120 kHz for 10 ms, and 115 kHz for 10 ms, then repeat, powering Tags tuned to 125 kHz, 120 kHz and 115 kHz, respectively. As long as the switching speed is fast enough, the human eye cannot see the flickering. This technique can be easily extended to allow the system to turn off, blink, or dim Tags 17 of a particular frequency.

FIG. 6 shows an example of how time division frequency switching can be used for illumination. The figure depicts a one-second window of signal generated by an Advanced Mat 15 divided into 100 ms slices. In the example, the 125 kHz signal turns on a white Tag 17, 120 kHz turns on a blue Tag 17 and 115 kHz turns on a red Tag 17. The user would see the white tag appear to be steadily illuminated with the blue tag blinking at the beginning of the second and the red tag blinking at the end of the second.

Another method of controlling and powering Tags 17 of different frequencies is to use the superposition principle where signals with the desired frequencies are summed together and used to drive the series resonant circuit. The sum of the relevant signals, e.g., 125 kHz, 120 kHz, and 115 kHz, can be done in analog hardware as shown in the diagram of FIG. 7, or it can be done in a spreadsheet tool such as Excel, and stored in a lookup table on the Microcontroller 51 for output to the series-resonant circuit. The signals can be either sine waves or square waves. To power a Tag 17 tuned to one of the described frequencies the series-resonant circuit would need to be tuned to the desired frequency of operation using the switches, e.g. no switches for 125 kHz, S1 on=120 KHz, S2 on=115 kHz. The benefit of this approach is that a signal containing all of the relevant frequencies is used to drive the series-tuned circuit and the proper frequency is selected by simply switching in or out capacitors to tune the series resonant circuit to one of the frequencies, powering a tag or group of tags tuned to the selected frequency. The time-slicing approach discussed above could then be used to create lighting effects by sequentially powering tags tuned to different frequencies.

Auxiliary Mat—Shown in FIG. 9, the Auxiliary Mat 19 consists of a tuned circuit consisting of a Auxiliary Winding 61 and Auxiliary Capacitor 63. The significant difference between an Auxiliary Mat 19 and a Power Mat 13 is that the Auxiliary Mat 19 has no driver circuit; it is completely passive. The Auxiliary Mat 19 is placed next to the Powered Mat 13 to extend the size of the powered area, and has no independent power source, but inductively couples with the primary mat causing itself to resonate producing another field capable of powering tags. Additionally, when an Auxiliary Mat 19 is placed near a Power Mat 13 the brightness of the Power Mat 13 will be reduced because of the power leeched by the Auxiliary Mat 19 to extend the field. Optional physical connectors can attach the Auxiliary Mat 19 to the Power Mat 13 to ensure it is positioned optimally.

These features are unique to this application and invention. There is no need for these features in typical induction mats used for charging batteries. Implementing these features would make a power charging mat very inefficient and could possibly damage devices attempting to charge with the system. For example a typical charging mat would not need a light sensor or timer or the ability to use multiple frequencies to blink or flicker lights. Charging mats for cell phones would never include this feature. Thus, the prior art teaches away from the construction of this invention and embodiment.

In building this embodiment, a method of creating the Primary Winding 21 using multi-conductor ribbon cable has been developed, making it easier to install the system on furniture and other systems. FIG. 8 shows the construction of a ribbon-cable based Primary Winding 21. The Interconnect Board 71 has two Insulation Displacement Connectors (IDC) 73a 73b. Once the Ribbon Cable 75 is connected to the IDCs 73a 73b, the assembly forms a coil usable as a Primary Winding 21 between the Board Output Terminals 79 in the Lighting System 11. While the interconnect board 71 is shown as a separate entity its functionality could be directly integrated with another circuit board and does not need to be independent. For example a single board could incorporate all of the mat electronics including the connectors and wiring to use a multi conductor ribbon cable for the primary winding 21.

The example in FIG. 8 shows a five-conductor Ribbon Cable 75 but this could be easily extended to 14 or more conductors. To select the number of turns on the coil a Jumper 77 is used to connect the desired number of turns to the output terminals 79. This system effectively creates a jumper-tunable Primary Winding (inductor) 21 that permits rapid integration with existing furniture such as tables and counter. If this coil system were not used, a custom coil would need to be wound using individual strands of wire, making construction more difficult and time consuming.

Other Applications for the Lighting System—As stated earlier, wireless illumination system described here could be used for model lighting, illuminated games, and furniture. FIG. 1 shows the Mat 13 in use with a Tag 17, Christmas Village Model Home 79, and Drinking Glass 81. Further discussion and examples follow.

a. A restaurant/bar can have a Primary Winding embedded in tables and bar areas and activate different frequencies to create different colors, or blinking in glasses, shot glasses, plates, coasters, check holders, menus, etc. as a signal to its patrons of specials, last call, or other similar restaurant-wide announcements without using a loudspeaker.
  b. A user can embed a Primary Winding 21, Power Mat 13, or Advanced Mat 15 under an aquarium, and employ frequency switching with a three-color LED that has three different coils tuned to each primary color of the LED to create any desired color.
  c. A Christmas village can include the Lighting System 11, allowing a someone to build, modify and play with the model buildings in a way that is not possible today, due to safety concerns and the possibility of twisted power cords.
  d. Poker chips that would illuminate when placed in the center of a poker table.
  e. A chess set where the chess board generates a field to illuminate chess pieces.
  f. Powered vase with the primary winding located in the base or mouth allowing inductively powered flowers to be illuminated. The flowers would have coils located in the stems and the LED in the flower itself. An advanced mat/winding could be used to control the color or blinking of the flowers.
  g. A powered tablecloth that could be placed on an existing table to power dishes, glasses, or other objects.
  h. Shoes that could illuminate and/or change color when the wearer walks on a stage or other item with a power mat embedded inside.
  i. A car playset using this lighting system could allow cars to light up and or light up with different colors or flash when placed in specific areas of the playset.

While this invention has been described as it is currently built, the invention is not limited to the disclosed embodiments, but can be employed in various equivalent arrangements included within the spirit and scope of the claims. Other embodiments could include the following structure and improvements:
  a. The ribbon cable coil that creates the primary coil could wrap around the mat multiple times for more turns. For example, two turns with ten-conductor ribbon cable is equivalent to 20 actual turns.
  b. Other types of multi-conductor cables could be used in the primary winding mat wiring in addition to ribbon cable, such as Cat 5 Ethernet and DB9 serial cables;
  c. The Tags could incorporate capacitors or other energy storage devices to allow them to operate for a time after power is removed from the mat, so a tag-equipped glass could continue emitting light while a user drinks from the glass and it is separated from the Primary Winding.
  d. System could support auto-tuning of the mat capacitors to maximize performance of the mat's time varying magnetic field.
  e. Ability to connect Power Mats and Auxiliary Mats with physical connectors that ensure proper placement, enlarging the area in which a Tag may be powered.
  f. The Power Mat can be integrated into a table, affixing the primary winding set under the table top.
  g. The Power Mat can be integrated into toys and play sets to allow other pieces of the play set to illuminate when placed in certain locations or on the set in general.
  h. As discussed in the prior examples, tags can be embedded into various objects such as glasses, toys, game pieces, clothing/shoes, dishes, and numerous items.

The invention claimed is:
1. A Lighting System, comprising:
  a. a Power Mat that creates a time-varying electromagnetic field in the vicinity of the Mat using a direct current voltage source, oscillator, driver, capacitor and electrical coil; and,
  b. embeddable wireless illumination Tags constructed with a parallel-turned LC-resonant circuit and light-emitting diode ("LED"), tuned to frequencies compatible with the Power Mat, so that when the Power Mat is energized and creating the electromagnetic field, the LED on the Tags emit light when the Tags are placed on the Power Mat.

2. A Lighting System of claim 1 with an additional Auxiliary Mat, comprising:
  a. A mat,
  b. An Auxiliary Winding, an electrical winding constructed such that the windings are embedded in the mat and encircle the mat area;
  c. A Capacitor set in series with the Auxiliary Winding,
  d. A relationship between the Auxiliary Winding's inductance and the Capacitor's capacitance so that the two components form a tuned circuit that will respond to an electro-magnetic field generated by the Power Mat's Primary Winding, transferring power form the Power Mat to Tags placed on the Auxiliary Mat, when the Auxiliary Mat is positioned near to, or on, the Primary Winding of the Power Mat.

3. The Lighting System of claim 1, with Tags integrated into objects such as toys, displays, models, glasses, and shoes.

4. The Lighting System of claim 1, with Tags that include additional electronic components to support blinking and flickering of the Tag's LED.

5. The Lighting System of claim 1, with Tags that include additional electronic components to allow a Tag to continue emitting light after being removed from the Mat's electromagnetic field.

6. The Lighting System of claim 1, with a Mat and Tags that include additional electronic components to allow a Timer and Button to allow the user to activate a specific Tag for a fixed or variable length of time or at a certain time of day based on the Mat's operation at specific frequency.

7. The Lighting System of claim 1, with a Mat and Tags that includes switches, environmental sensors, and additional electronic components to allow the System to respond to changes of state of the switches to create programmed responses in Tag lighting effects.

8. The Lighting System of claim 1, with a Mat and Tags that includes a light sensor and additional electronic components to allow the System to respond to changes in ambient lighting with programmed responses in Tag lighting effects.

9. The Lighting System of claim 1, with a Mat and Tags, in which the Mat employs multiple frequencies to energize Tags tuned for those frequencies.

10. The Lighting System of claim 1, with a Mat that can operate at multiple frequencies using time slicing and/or superposition of drive control signals to power Tags tuned to different frequencies, e.g., 125 kHz, 120 kHz, 115 kHz to create lighting effects such as steady on, blinking, dimming, or flickering.

11. The Lighting System of claim 1, with a Mat that can operate at multiple frequencies, e.g., 125 kHz, 120 kHz, 115 kHz using time slicing and/or superposition of drive control signals to power Tags with multiple independent LEDs of different colors (e.g., red, green, blue) and coils tuned to different frequencies, to create lighting effects and color changes.

12. The Lighting System of claim 2, with the additional element of physical connectors on the edges of the Power Mat and Auxiliary Mat so they can connect to each other for proper positioning to maximize power transfer between the mats.

13. A method of announcing drink specials and making important announcements, comprising:
a. Installing an LED Tag into the bottom of a drinking mug, glass, plate, check holder, menu or other object;
b. Installing an Advanced Power Mat into all the bar table top;
c. Installing a user interface for the Power Mats, so a user can energize all the tables with a particular frequency, and all the glasses being used will be illuminated or flash, or change colors as directed by the User.

\* \* \* \* \*